(12) United States Patent
Gray

(10) Patent No.: US 6,249,396 B1
(45) Date of Patent: Jun. 19, 2001

(54) MAGNETIC MEDIA HAVING PARTITIONED AND PRESATURATED DATA TRACKS

(75) Inventor: Martin D. Gray, La Jolla, CA (US)

(73) Assignee: Overland Data, Inc., San Diego, CA (US)

( * ) Notice: Subject to any disclaimer, the term of this patent is extended or adjusted under 35 U.S.C. 154(b) by 0 days.

(21) Appl. No.: 09/300,199

(22) Filed: Apr. 27, 1999

Related U.S. Application Data

(62) Division of application No. 08/641,529, filed on May 1, 1996, now Pat. No. 5,898,534.

(51) Int. Cl.$^7$ ....................................................... G11B 5/02
(52) U.S. Cl. .................... 360/55; 360/77.06; 360/77.07; 360/131
(58) Field of Search ............................ 360/77.06, 77.07, 360/77.11, 77.02, 77.12, 58, 57, 55, 131, 66, 41, 63

(56) References Cited

U.S. PATENT DOCUMENTS

| | | |
|---|---|---|
| 4,501,000 | 2/1985 | Immink et al. . |
| 4,652,945 * | 3/1987 | Marchant ...................... 360/77.07 X |
| 4,724,369 | 2/1988 | Hashimoto . |
| 4,766,508 | 8/1988 | Mathewson . |
| 4,912,574 | 3/1990 | Kobayashi et al. . |
| 4,975,791 | 12/1990 | Eggebeen . |
| 4,979,051 | 12/1990 | Eggebeen . |
| 5,025,330 | 6/1991 | Nishimiya . |
| 5,055,951 * | 10/1991 | Behr et al. ...................... 360/77.07 X |
| 5,057,948 | 10/1991 | Lutzeler . |
| 5,060,092 | 10/1991 | van der Kop . |
| 5,309,296 | 5/1994 | Nagase et al. . |
| 5,309,299 | 5/1994 | Crossland et al. . |
| 5,321,570 * | 6/1994 | Behr et al. ...................... 360/77.07 X |
| 5,436,773 | 7/1995 | Hanson . |
| 5,712,863 * | 1/1998 | Gray ...................................... 375/366 |
| 5,815,514 * | 9/1998 | Gray ...................................... 341/59 |

FOREIGN PATENT DOCUMENTS

| | | |
|---|---|---|
| 33 30021 A1 | 2/1985 | (DE) . |
| 0 034 938 A2 | 9/1991 | (EP) . |
| 0 551 570 A1 | 7/1993 | (EP) . |
| 77 30890 | 5/1978 | (FR) . |
| WO 96/11470 | 4/1996 | (WO) . |

* cited by examiner

*Primary Examiner*—Alan T. Faber
(74) *Attorney, Agent, or Firm*—Knobbe Martens Olson & Bear LLP

(57) ABSTRACT

The present invention provides an apparatus and method of partitioning a recording medium data track into two longitudinal regions and erasing any preexisting signal on each region with a DC bias signal of polarity opposite to that of the other region. Magnetic transitions subsequently recorded over the two track regions will be shifted differently depending on the relationship of the polarity of the signal being encoded to that of the DC bias erase signal applied to each region. The complementary lead/lag errors from the two track regions produce a combined read head waveform in which the timing errors are substantially eliminated, thereby reducing system bit error rates and allowing increased data density on the medium. An apparatus and method of controlling the lateral position of the various heads are also disclosed.

37 Claims, 9 Drawing Sheets

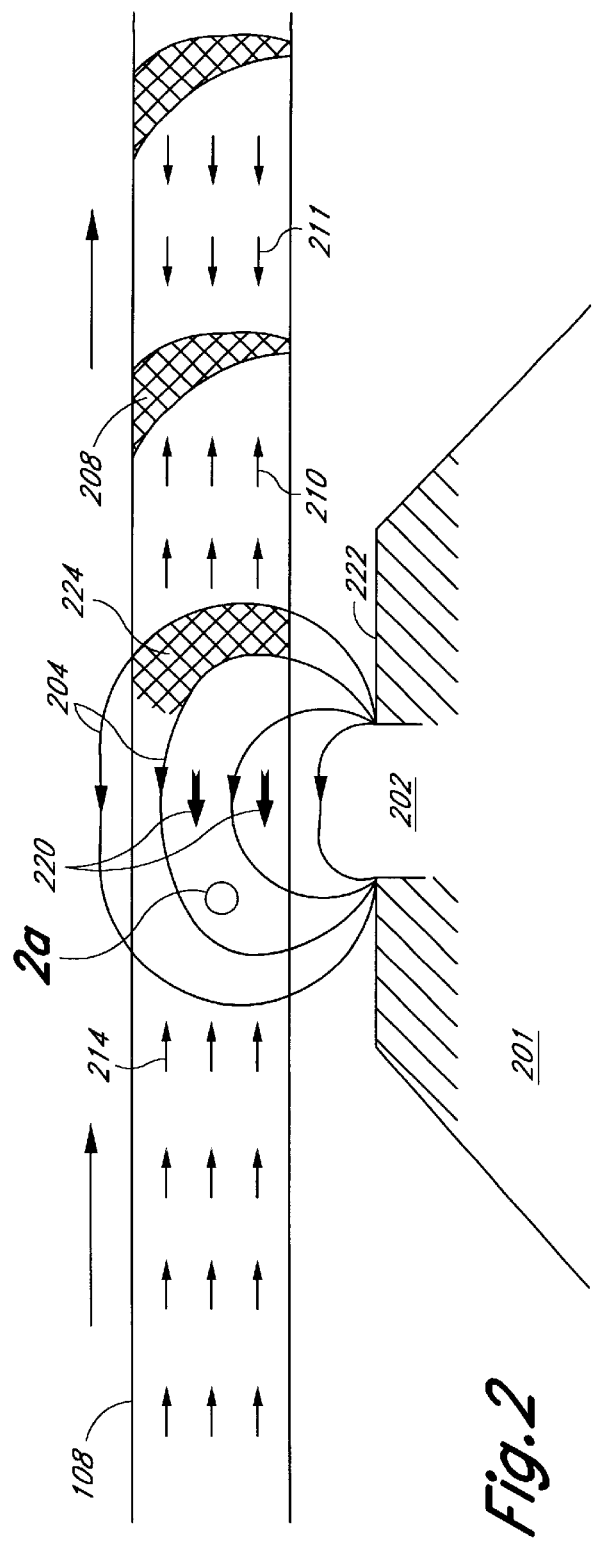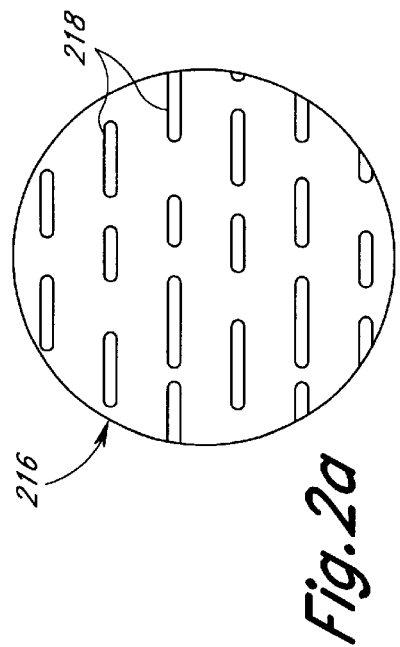
Fig.2
Fig.2a

MAGNETIC MEDIA HAVING PARTITIONED AND PRESATURATED DATA TRACKS

CROSS REFERENCE TO RELATED APPLICATIONS

This application is a divisional of U.S. patent application Ser. No. 08/641,529, entitled Magnetic Media Having Partitioned and Presaturated Data Tracks, and filed on May 1, 1996, now U.S. Pat. No. 5,898,534.

FIELD OF THE INVENTION

The present invention is directed to an electromagnetic recording apparatus for storing digital data on magnetic disk or tape. Specifically, the invention relates to DC biased prepolarization of the recording tracks of a magnetic medium.

Background of the Invention The recording surface of a magnetic medium such as a tape or disk is generally comprised of ferrous oxide particles of varying sizes and shapes suspended in a polymer base. These particles experience an orienting force via the application of an external magnetic field which is generated by the gap of a magnetic recording head. The external magnetic field will tend to align the magnetic dipoles in the medium relative to the field direction and will result in a remanent magnetization when the field is removed. The coercivity, or field strength required to "coerce" each dipole into realignment, is a function of numerous factors including dipole size, shape, and material. Furthermore, the magnetic particles interact with one another to varying degrees, thereby affecting each other's tendency to reorient when exposed to an external magnetic field. The practical outgrowth of this behavior is that realignment of the magnetic dipoles in the recording medium by the recording head is neither uniform nor instantaneous, and depends on a number of factors including the external field strength and the field strength resulting from the medium itself.

When a binary data stream is written onto a magnetic medium, it is encoded into a series of regions with varying magnetic orientations. For the sake of this discussion, these regions may be described as "positive" and "negative" states which correspond to two differing orientations of the north and south poles of the dipoles contained within the magnetized regions. As a bit stream is serially input to electronics controlling an inductive write head held near a moving magnetic medium, the polarity of the write current is switched back and forth to create this series of magnetized regions.

During the write process, the write signal current flowing through the coil of the write head induces a magnetic field centered over the write head gap. In addition, the magnetization of the media itself produces a local magnetic field which adds to the write head field to produce the net magnetic field strength affecting particle orientation. One such field results from the pole strength of the transition being recorded. An additional field contribution is created by preexisting media magnetization, whether from prior DC biased erasure, or from preexisting data which is being overwritten. The field of the recently encoded transitions as well as the field associated with the previously recorded data may either strengthen or weaken the field generated by the write head such that a timing error will be introduced in the recorded data stream for the affected bits. The effect on the write head (recording) field by the fields generated by previously recorded data and recently recorded transitions is determined by a number of factors, including the polarity of the data/transition poles and their physical proximity to the write head. Accordingly, the fields generated by the transition poles and the prior recorded data produce a resulting field which either enhances or mitigates the write field such that the transition being encoded shifts backward (i.e., in the direction of medium travel) or forward (i.e., opposite the direction of medium travel) in position, respectively. When a forward shifted transition is encountered by the read head, it will produce a resulting signal peak which is shifted behind or lags in time in relation to the remainder of the data since the transition zone does not reach the read head until slightly later. Similarly, a backwards-shifted transition produces a peak with a timing lead when read since it reaches the head earlier.

Timing errors may be reduced by erasing any preexisting data or residual magnetization on the medium. This in theory will eliminate the overall write field contribution from this source. The medium may be erased by applying a decaying high frequency alternating current signal (with peak coercivity substantially in excess of that of the particles in the medium) via an erase head to effectively randomize the magnetic orientations of the medium in order to eliminate the effects of the field generated by preexisting data. This method, however, may have the undesirable side effect of introducing unwanted noise into the recorded signal upon read/playback resulting from a variety of sources including transition noise, under- or over-bias, ac waveform distortion, or anhysteretical recording of recording head flux images. Noise induced by AC erase is especially acute in the newest high coercivity/high particle uniformity tape media such as those of the metal evaporated (ME) and metal particulate (MP) varieties.

A direct current signal may also be utilized to erase the existing data prior to recording the new signal. Unlike the AC method described above, a DC (presaturation) signal is applied via one of the heads in order to create a constant magnetic polarization on the surface of the media. This process has also been found to induce distortion in the recorded signal as a result of DC remnance in the magnetic medium and the creation of a second field as previously described. By erasing with a DC signal biased in one orientation or the other prior to recording, a systematic series of lead and lag errors will be produced on the medium. This results from the contribution of the magnetic field generated by the erased portions of the medium as it approaches the write head (similar to the effect of the previously recorded data discussed above). If the bias is reversed, the systematic errors will merely be inverted, i.e., leads will become lags and vice versa. A system disclosed in U.S. Pat. No. 5,057,948 compensates for the distortional effects resulting from a dc erase field by superimposing a dc magnetic field bias of opposite polarity on the signal to be subsequently recorded. This bias generates a stronger or weaker field in the write gap to offset the remanent erase field. However, that system does not account for variations in the preexisting bias field, and recites no mechanism for determining the appropriate level of bias signal to be superimposed on the data signal being recorded.

It is further noted that as the data encoding rate for a given transport speed of the recording medium (data density) is increased, the width of each transition zone becomes more significant, as does any lead or lag error in the peak associated with each transition. This results primarily from the reduced width of the magnetic region associated with each data bit; a given transition zone width or lead/lag shift will accordingly constitute a larger percentage of the encoded region at data density is increased. When very high data rates or densities are used, some overlap of the read head waveform "events" resulting from adjacent bits occurs. Accordingly, media with relatively narrow distributions of particle coercivity (SFDs) are preferable since they generally allow greater data storage capability while maintaining acceptable system bit error rates (BERs). Similarly, minimization or elimination of peak shift timing errors will allow greater data density while preserving an acceptable BER.

In addition to the problem of signal distortion due to longitudinal shifts in the position or timing of data bit transitions, lateral alignment of the read/write head(s) has also been problematic. If the head is not aligned properly on the track, missing data, signal distortion, and/or excessive crosstalk (i.e., simultaneous reading of more than one track) may result.

Various schemes of lateral head alignment or improvements thereon have been disclosed in the prior art. It is a common feature of all of them, however, that separate head tracking signals must be included in the magnetic medium. For example, U.S. Pat. No. 5,060,092 discloses a system by which a recording medium track is divided into halves, with a first and second tracking signal being applied to the first and second halves, respectively, of every nth track (n being greater than 1) through a bifurcated recording head. Also, U.S. Pat. No. 4,766,508 discloses a floppy disk tracking apparatus which records burst tracking signals in disk sector interstices on alternating sides of a given track (as opposed to the traditional simultaneous recording of burst tracking signals on both fringes of the track through use of two read/record circuit channels). The presence of such tracking signals reduces the amount of recording media available for data storage. In tape cartridges such as the QIC (Quarter Inch Cartridge) format, it is conventional to provide sets of servo tracks, one of which is constantly monitored by one read head while a separate read head scans a data track. In disk drive systems, servo segments are typically embedded between data sectors such that the read head periodically passes over the servo segments when reading data. Typically, two serially adjacent servo signals are provided, one laterally offset from the center of the data track to one side, one laterally offset from the center of the data track to the other side. After the read head passes over these servo segments, the signal strength from the two signals are compared. If the read head is centered over the associated data track, the signal strength from the two servo segments should be equal. The degree of servo signal difference, as well as a determination of which of the two signals is larger provides information concerning the magnitude of read head offset from the center of the track. This information is fed to a motor controller which adjusts the head position back to the center of the data track. In both cases, valuable media area is taken up with tracking information.

Based on the foregoing, it would be highly desirable to provide an improved erasure/recording method by which timing errors in data bit state transitions encoded in the data could be eliminated without the introduction of unwanted noise or distortion inherent in traditional alternating or direct current erase systems, and without imposing further limitations on the data storage capacity of the medium. Furthermore, it would be desirable to provide an improved lateral positioning system of reduced complexity for the read/record head(s) which would provide accurate lateral positioning of the read/write head assembly without relying on dedicated servo information embedded on the media.

SUMMARY OF THE INVENTION

An improved apparatus and method for storing digital data on a magnetic medium is disclosed. A magnetic recording medium, which may be magnetic disk, tape, or any other magnetic medium is provided having a plurality of parallel or concentric tracks for recording signals thereon. In one embodiment, at least one track has a first portion which extends partially across the width of the track which is substantially polarized in a first orientation, and a second portion which also extends partially across the width of the track which is substantially polarized in a second orientation. Preferably, the first and second orientations are opposite to one another. In a preferred embodiment, these track regions are created by a DC bias erase signal of a first polarity applied to the first track portion via one or more erase heads, while a second DC bias erase signal of opposite polarity to the first is applied to the second track portion. Accordingly, the halves of each track have opposite magnetic polarities after erasing but prior to recording. During recording, a write head encodes an incoming data bit stream which is superimposed over both halves of the track simultaneously, creating magnetic transitions on the track. When subsequently read, the transitions produce a read signal which comprises a contribution from the magnetic transition on the first track portion and a contribution from the magnetic transition on the second track portion.

The read signal contribution from each half of the track will lead or lag the true position or timing on the medium based on the polarity of the transition and the polarity of the track half being recorded over. For a given signal transition, a timing lead will occur for the track half with magnetic polarity similar to the state being transitioned to, and conversely a lag will occur for the other half (due to its opposite polarity). The data signals subsequently read from each track half pair form a composite waveform in the read head; this waveform is effectively an "average" of the two waveforms generated by each track half and accordingly eliminates the lead/lag timing errors associated with each. Noise and/or signal distortion associated with the use of traditional high frequency AC or uncompensated DC erase methods are therefore avoided.

Furthermore, when reading an encoded data stream written to a track according to the present invention, residual lead/lag timing errors will be generated when a read head is laterally off center from the track. As these residual errors can be utilized to create a servo loop for controlling lateral head position, the disclosed invention further relates to a method and apparatus for accurately determining and controlling the lateral position of the read head or heads relative to the recording medium. This is advantageous in that servo information can be derived from the stored data itself, and tracking information need not be present on the media. Accordingly, a preferred embodiment of the present invention includes a method of controlling the lateral position of a read head over a track on a magnetic recording medium comprising the steps of periodically sampling an analog read signal, calculating a number indicative of the lateral position of the read head using one or more of the sampled digital values, and altering the lateral position of the read head in response to the magnitude or sign of the calculated number.

BRIEF DESCRIPTION OF THE DRAWINGS

FIG. 2 is a cutaway side elevational view of a write head gap in proximity to a magnetic medium illustrating the physical recording process including the interaction of the write field with the magnetic medium.

FIG. 3b is a graphical representation of an idealized read head response as a function of time from the transitions produced by the write current of FIG. 3a.

FIGS. 7 and 7a are top plan views of a multi-track magnetic recording medium, illustrating the magnetization of a track following presaturation in accordance with FIG. 5 and the application of the write current of FIG. 6a.

DETAILED DESCRIPTION OF THE PREFERRED EMBODIMENT

Figure 1:
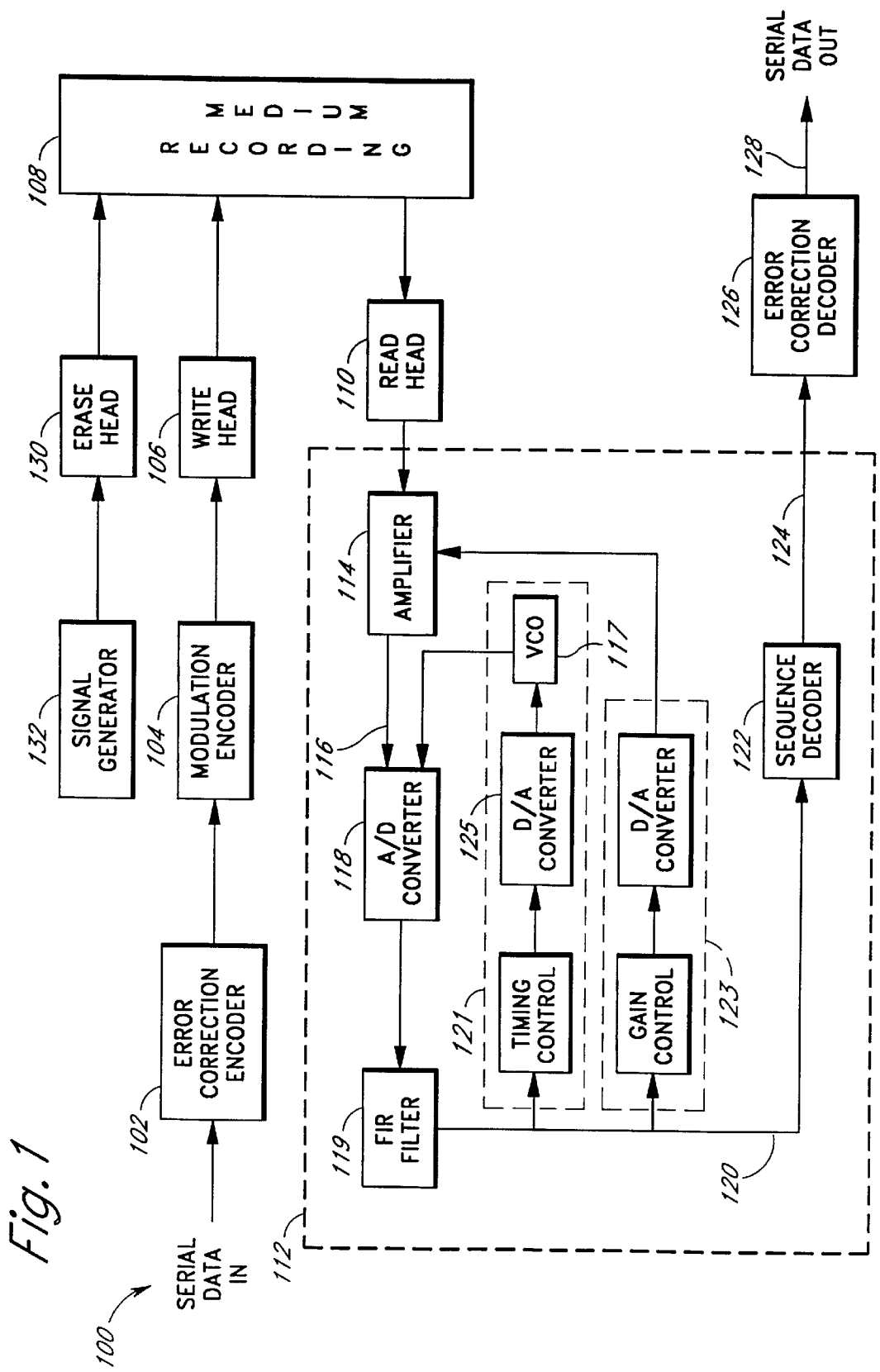
FIG. 1 is a block diagram of a digital magnetic recording circuit as may be utilized with magnetic disks or tape.

In the following description, reference is made to the accompanying Figures wherein like numerals refer to like elements throughout. FIG. 1 is a block diagram of a recording channel of a disk or tape drive. Circuits functioning according to the general scheme of the channel of FIG. 1 are well understood to those of ordinary skill in the recording art, and are described only in general terms below.

The input to the recording channel is a serial stream of binary digits 100 representing data to be stored on a magnetic medium. The incoming bit stream 100 is preferably encoded at block 102 for error correction and detection, using one or more of numerous coding schemes that are well known in the art. Preferably, the error correction encoding includes the use of CRC fields, Reed-Solomon codewords, and block interleaving for error detection and correction, as well as fixed or variable rate run-length limited encoding to ensure adequate phase and amplitude content in the read signal produced by the recorded bit stream.

The encoded bit stream is then translated into a modulated write current by a modulation encoder 104 which drives an inductive write head 106 that is positioned in close proximity to the magnetic medium 108. As with the error correction coding, various forms of modulation coding are known in the art and may be used with the present invention. One preferred modulation code is the NRZ-M or NRZI scheme, the use of which is described in more detail with reference to the present invention in the discussion accompanying FIGS. 3 through 7 below. Under the NRZ-M scheme, a data "1" is encoded as a state change or magnetic orientation transition on the magnetic medium 108 whereas a "0" is encoded as no transition. Hence, a stream of "1"s is encoded as a series of alternating state transitions, each transition being temporally aligned with the relevant data bit being encoded. When a "0" is included in the data stream, the magnetic state from the preceding bit (which may be either of the two allowable magnetic orientations specified for this illustration) will be preserved on the medium 108. If a second "0" immediately follows the first, no state change will occur. However, when another "1" is included, a state change will result. The incoming data stream is therefore translated into a series of magnetization transitions on the magnetic media 108.

During read out of the media stored data, a read head 110, which may be inductive, magnetoresistive, or may comprise any other field sensing transducer, produces a read voltage or current output which varies as the head passes over magnetic transitions previously laid on the medium 108 by the write head 106. The signal from the read head 110 then is passed to the input of a detection and discrimination circuit 112. This circuit 112 includes several fundamental components as illustrated in FIG. 1. An analog amplifier circuit 114 is provided which outputs an amplified read signal at node 116. A flash analog to digital converter 118 periodically samples the amplified analog read signal present at node 116. A FIR filter 119 receives the digitized amplitude values from the analog to digital converter 118, and digitally filters the sampled values according to a desired spectral shape. Finally, the output of the FIR filter 119 provides the input at node 120 to a sequence decoder 122, which translates the sequence of digital samples present at node 120 into a decoded serial bit stream which is output at node 124.

The sequence decoder 122 can be either peak detecting or utilize a maximum likelihood algorithm as part of a partial response recording channel. Although either recording channel design may be used with the present invention, a peak detection system is treated as illustrative below. If a partial response system is used, it is most preferable when the encoding performed at block 102 is as described in co-pending patent applications Ser. Nos. 08/599,146 now U.S. Pat. No. 5,712,863, and 08/599,149, now U.S. Pat. No. 5,815,514 entitled "Randomizing Encoder For Digital Data Storage" and "Variable Rate Bit Inserter For Digital Data Storage" respectively. The disclosures of the Ser. Nos. 08/599,146 and 08/599,149 applications are hereby incorporated by reference in their entirety.

Of course, the serial data stream output at node 124 is preferably identical to the error correction encoded serial data input stream encoded during the write process, but timing and gain errors, noise, signal dropouts, and other error sources invariably introduce a certain bit error rate in the output at node 124 due to misinterpretation of measured sampled values fed to the sequence decoder 122 at node 120. These errors may be correctable by the error correction encoding scheme used, but reductions in the raw number of errors present at node 124 are desirable. The data stream at node 124 is then fed to an error correction decoder 126 which deinterleaves the data stream and removes added bits inserted by the error correction encoder 102 during the write process, to reproduce the original data stream at node 128.

In accordance with the present invention, the recording channel preferably includes a signal generator 132 which drives one or more erase heads 130, described in more detail with reference to FIGS. 8a and 8b.

Referring now to FIG. 2, during the write process, a write current flowing through the coil of the write head 201 creates a magnetic field centered over the write head gap 202. The magnetic field intensity distribution resulting from this gap is spatially complex; however in general the intensity of the field dissipates as distance from the gap 202 is increased. Lines of spatially constant field intensity 204 can be modeled such that they cut through the magnetic medium 108, illustrated in FIG. 2 as a segment of magnetic tape placed in proximity to the gap 202.

In addition to the field produced by the write current, two other types of magnetic fields must be considered. First, a demagnetizing field results from the pole strength of the transition being written. A transition of magnetic orientation creates magnetic poles in the recording medium (separated by the transition region 208) corresponding to the two different magnetic orientations 210, 211 encoded on the magnetic medium 108. For example, under the NRZ-M scheme previously described, a data "1" will initiate an orientation transition by reversing the write current and producing two different magnetic orientations on either side of the transition 208. These poles generate their own magnetic field in addition to that of the write current. Another type of field is created by preexisting media magnetization irrespective of the presence of transitions. Any preexisting magnetization 214 on a track being presently recorded upon will generate a magnetic field. This field may either locally strengthen or weaken the recording field generated by the write current.

By modeling the medium 108 between surfaces of constant field strength as infinitesimal volumes 216, the effects of the magnetic field on the recording medium 108 may be considered. As a generalization, if the total average field strength for a given volume element of the recording medium 108 is greater than the coercivity of the particles 218 in that volume, then those particles will switch magnetization in accordance with the field. As the volume element 216 is moved away from the field source, the field intensity decreases, and the particles will be "frozen" in their orientation existing when the field strength fell below the applicable coercivity value. The field intensity 220 immediately above the gap 202 is sufficient to reorient most all dipoles to a given depth of medium; therefore, as the medium 108 and head 201 move in relation to one another, only the "trailing edge" of the gap 222 (i.e., corresponding to the side from which the recorded tape emerges) is of concern. Hence, as a medium 108 passes by the write head gap 202, substantially all of the particles 218 will be reoriented consistent with the field 220 immediately above the gap. As the medium proceeds past the gap, the intensity of the field will be progressively reduced such that the particles in the medium will freeze in orientation as they cross the field strength line 204 roughly corresponding to their individual coercivity. Since there is a range of particle coercivities (as measured by the switching field distribution or SFD), the "freeze" points will be distributed throughout a given volume 216 of the medium.

To create a transition when encoding data, the existing field generated by the write current collapses and is subsequently reestablished with an opposite polarity in a short period of time. During this transition period, the field intensity 220 falls below the coercivity of the particles 218 in the medium; hence, the region where the field intensity exceeds the particle coercivities grows smaller and closer to the gap 202 as the field dissipates and then subsequently expands as the field is reestablished with a different polarity. In essence, therefore, the freeze zone on the trailing edge 222 of the gap 202 translates closer to and then further away from the gap 202 during a given data transition.

The field of the recently encoded transitions (demagnetizing) as well as the field associated with the previous magnetization 214 may hinder or assist the field generated by the write head such that a temporal shift or timing error will be introduced in the recorded data stream. In the case of the transition 208 encoded immediately prior to the transition of interest 224, the demagnetizing field will tend to mitigate the write field at the trailing edge 222 of the gap 202 such that when the write field collapses and is reestablished, its intensity in this region will be less than it would have been without the demagnetizing field. Particle freezing will occur closer toward the gap 202; hence, the transition will appear to be shifted forward in time (i.e., toward the gap 202). In the case of prepolarization 214 from prior encoded data or a DC presaturated region approaching the gap, the field from this media region may either enhance or mitigate the write field such that the transition 224 shifts forward (field opposite that of what is being generated by the write head) or backward (field assisting the write head field) in position along the medium 108. When a forward shifted transition is encountered by a read head, it will produce a resulting signal peak which is shifted behind or lags in time, and similarly, a backwards-shifted transition produces a peak with a timing lead when read.

These timing errors are significant because both peak detect and partial response recording channels require properly timed analog to digital samples and accurate gain control to properly interpret measured read signal amplitudes for sequence decoding. In both systems, a timing loop is used to synchronize the sampling of the analog to digital converter (ADC) associated with the read head to the incoming bit stream. In a peak detection system, phase errors are computed by monitoring the slope of the read signal at the sampling point; a non-zero slope indicates that the transition peak is shifted either ahead or behind of the sampling point, and sample timing is therefore off. In partial response systems, a more complex reading and decoding methodology is employed which samples the read waveform at locations which do not necessarily coincide with the encoding peaks and analyzes a series of sampled values to determine the most likely bit sequence which would produce the series of sampled values. Accordingly, a gain control loop 123 and timing loop 121 are included in the detection and discrimination circuit 112 of FIG. 1 in order to insure that the samples being interpreted are being appropriately amplified and are in a proper phase relationship with the transitions on the media 108 being detected.

In peak detecting channels, the phase and frequency of sampling is corrected if sampling is offset from the transition induced peaks where the read waveform has a zero slope. The calculated phase error is typically converted into an analog voltage or current signal with a digital to analog converter 125. This analog phase error signal is input to a current or voltage controlled oscillator 117 which in turn controls the sample times of the analog to digital converter 118 which is monitoring the read voltage. Since the data encoding/sampling rate is high in comparison to the response time of the phase shifting circuitry, phase corrections are normally calculated over an interval of numerous individual data bits. Individual peak shifts due to overwrite of prerecorded or DC erased data are therefore not correctable by the timing loop circuit.

Figure 3A:
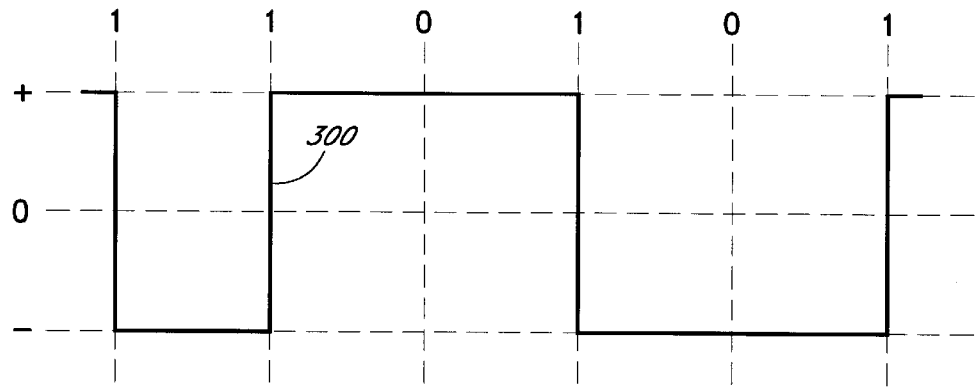
FIG. 3a is a graphical representation of the write current as a function of time produced by an NRZ-M encoded example bit sequence.
Figure 3B:
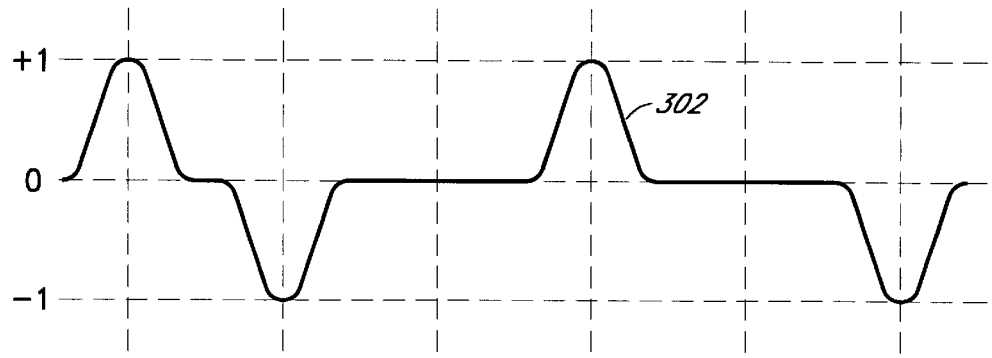
Figure 3C:
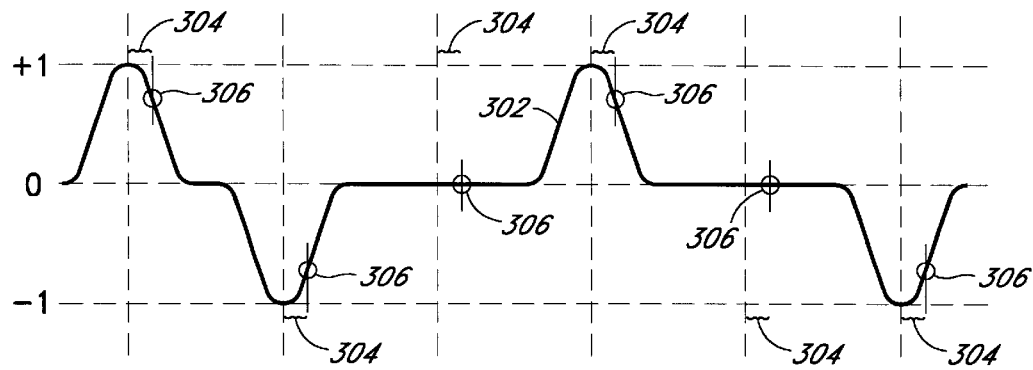
FIG. 3c is a graphical representation of the read head response of FIG. 3b and showing sampling points for subsequent decoding.

The nature of these peak shifts is further illustrated in the context of a peak detecting recording channel with reference to FIGS. 3a–3c and 4a–4c. FIG. 3a illustrates the write current 300 produced by the NRZ-M encoded bit stream "110101", while FIG. 3b illustrates an idealized read head response waveform 302 of the read head when sensing the above-identified encoded data stream; the alignment of each voltage response peak with the data transition as shown in FIG. 3b is indicative of the absence of any overwrite induced peak shifts. Referring now to FIG. 3c, any systematic phase offset 304 in the read signal sample points 306 will be corrected by the timing loop 121 described above, until data points are taken at the peaks of the transitions.

Figure 4A:
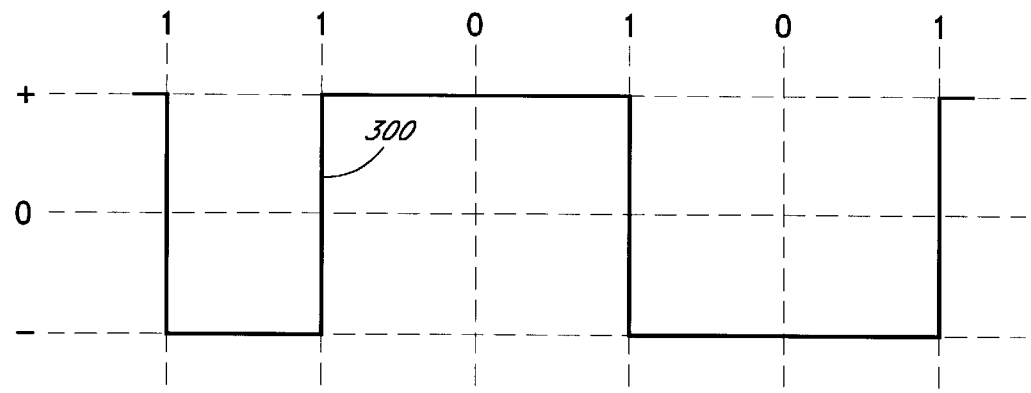
FIG. 4a is a graphical representation of the write current produced by an NRZ-M encoded example bit sequence (same as FIG. 3a).
Figure 4B:
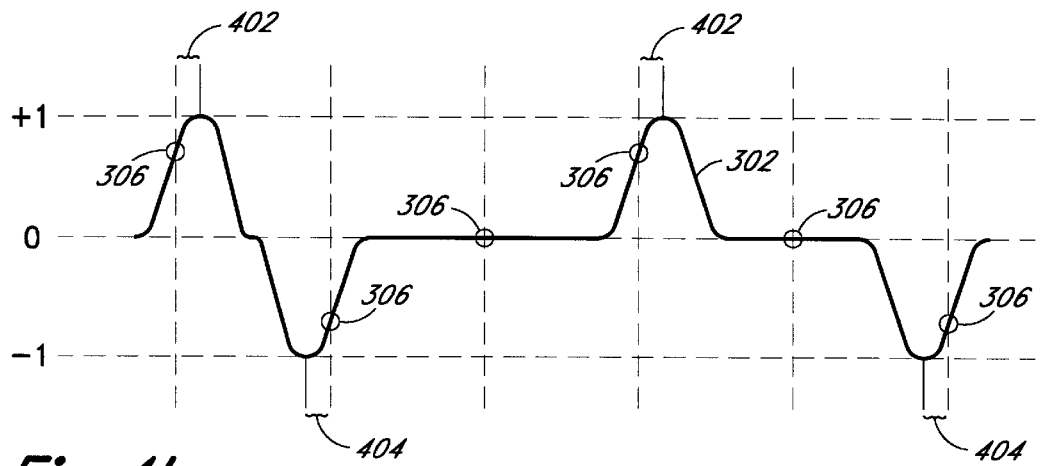
FIG. 4b is a graphical representation of the read head response from the transitions produced by the write current of FIG. 4a when the medium is presaturated in a first orientation prior to writing.
Figure 4C:
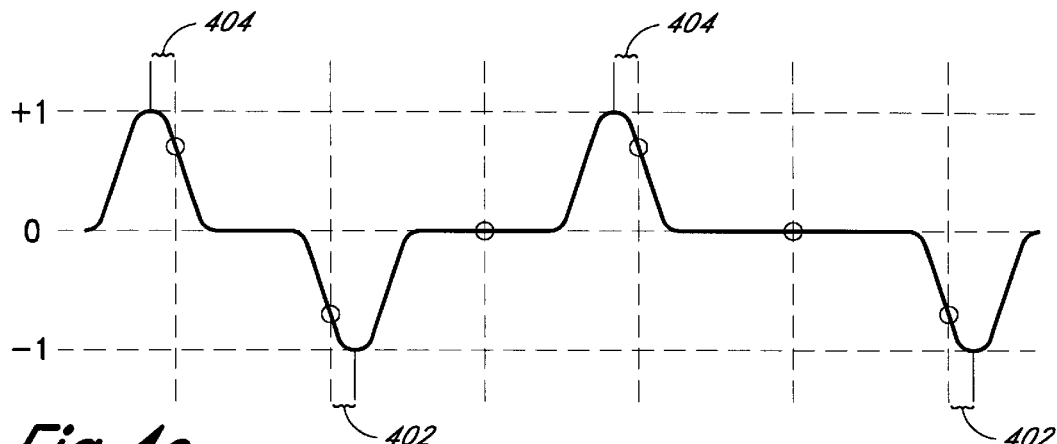
FIG. 4c is a graphical representation of the read head response from the transitions produced by the write current of FIG. 4a when the medium is presaturated in a second orientation opposite to the first orientation of FIG. 4b.

FIG. 4a shows the same NRZ-M encoded bit stream write current 300 as FIG. 3a. FIG. 4b, however, illustrates the peak shifts which occur if the track on the media is presaturated in a first orientation by an erase head prior to writing the data. In this case, the peaks corresponding to the "1"s of the bit stream alternately lead 402 and lag 404 their position in the idealized waveform as illustrated in FIG. 3b. Note that leads 402 will result for data bits being encoded with polarity similar to that of the presaturation polarity, while lags 404 will result for data bits with opposite polarity. Referring now to FIG. 4c, if the original presaturation is of a magnetic orientation opposite to that of the first, the timing errors will be inverted, i.e., leads will become lags and vice versa.

Figure 5:
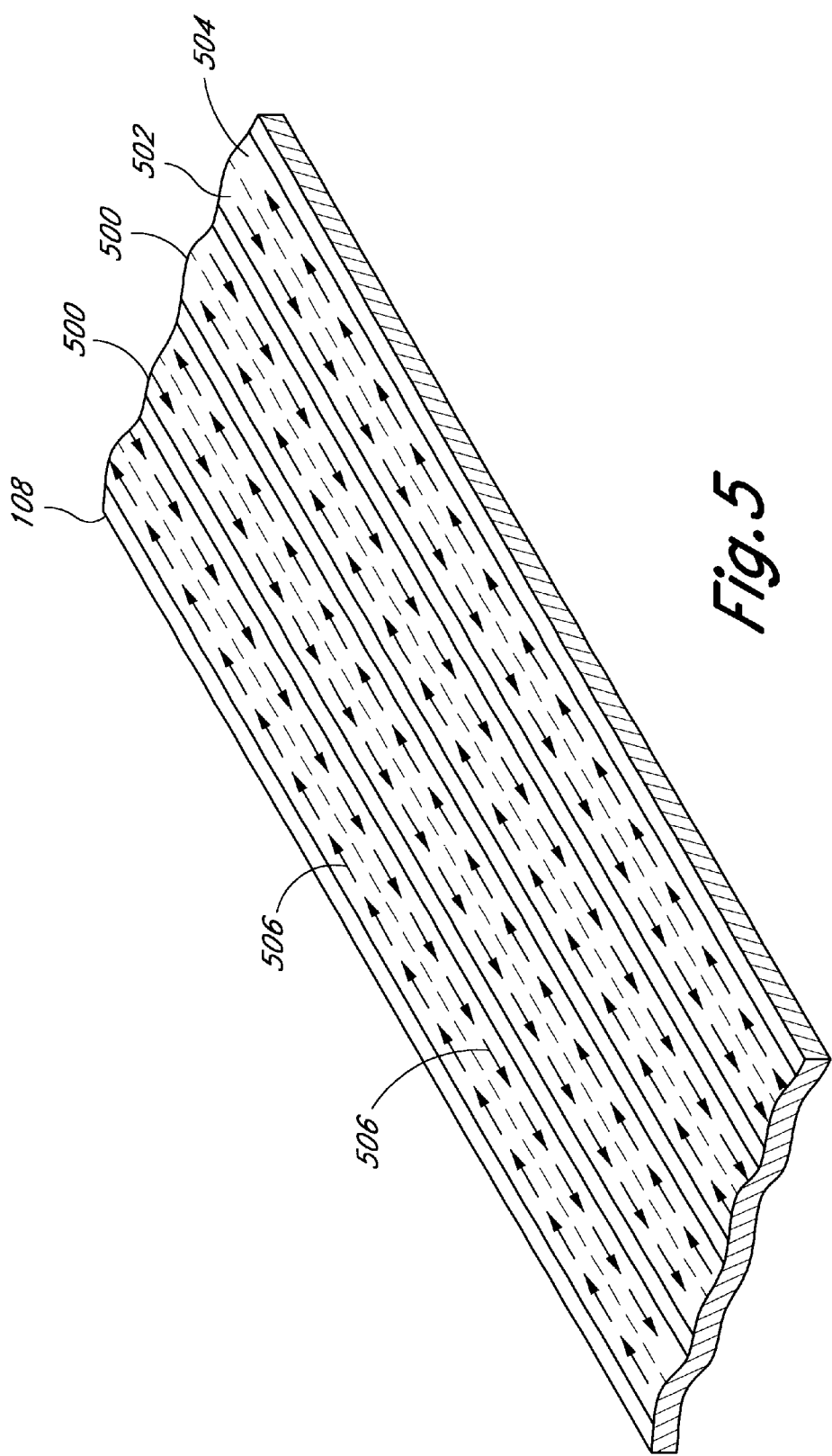
FIG. 5 is a cutaway view of a recording medium having multiple tracks, each track being prepolarized in halves according to a preferred embodiment of the present invention.

A preferred embodiment of the present invention which significantly reduces these presaturation induced timing errors is illustrated in FIG. 5. In accordance with an aspect of the present invention, the surface area of a recording track 500 on a multi-track magnetic medium 108 is divided into halves, a first half 502 and a second half 504 disposed parallel to one another longitudinally along the length of the track. As illustrated in FIG. 5 with directional arrows 506, the two track halves 502, 504 are presaturated with DC bias signals of opposite polarities. Following this prepolarization, the magnetic transitions representing stored data are superimposed over the previously recorded split DC bias track polarization configuration on both halves simultaneously by the write head 106. Unlike the split DC bias presaturation, therefore, the data is written on both the first half 502 and the second half 504 of the track simultaneously, such that opposite halves of the track are not oppositely polarized following the write process.

Although the preferred embodiment described herein and pictured in FIG. 5 comprises oppositely biased track halves, it will be apparent to those of skill in the art that other polarization configurations could be used with similar results. For example, each track could contain more than two polarized regions. The polarized regions could also be separated by regions which are not polarized or which still contain remnant polarization from previously written data. AC erased regions could also be additionally provided.

Figure 6A:
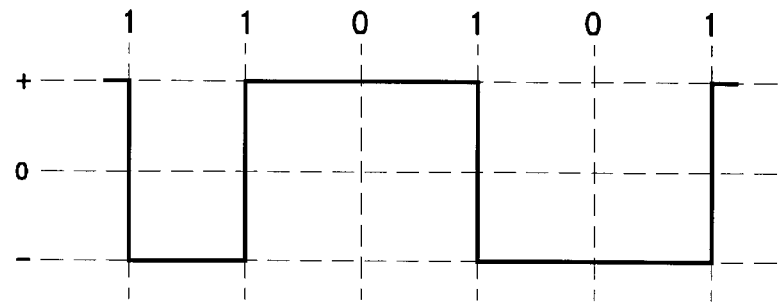
FIG. 6a is a graphical representation of the write current produced by an NRZ-M encoded example bit sequence. (Same as FIG. 3a.)

Similar to FIGS. 3a and 4a, FIG. 6a illustrates the write current 300 for the NRZ-M encoded bit stream "110101". As discussed above, this write current induces state changes in the magnetic orientation of the recording medium 108 corresponding to each current reversal. As these transitions are written to the split track 500 of FIG. 5, the first half 502 will respond differently than the second half 504 of the track due to their differing presaturation orientations. The signal from the read transducer 110, which is responsive to the rate of flux change as the head passes over a magnetic orientation transition, will be a sum of the contributions from each track half.

Figure 6B:
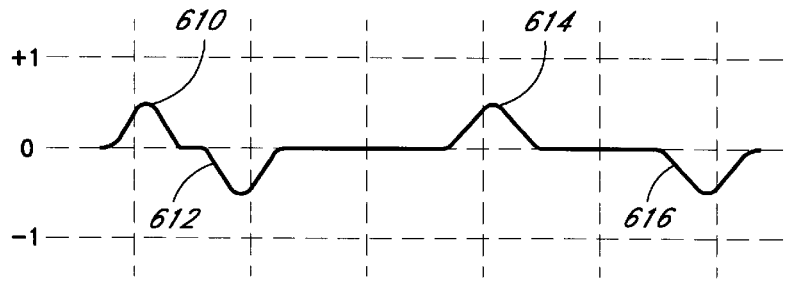
FIG. 6b is a graphical representation of the read head response attributable to the transitions encoded on a first half of the track of FIG. 5.
Figure 6C:
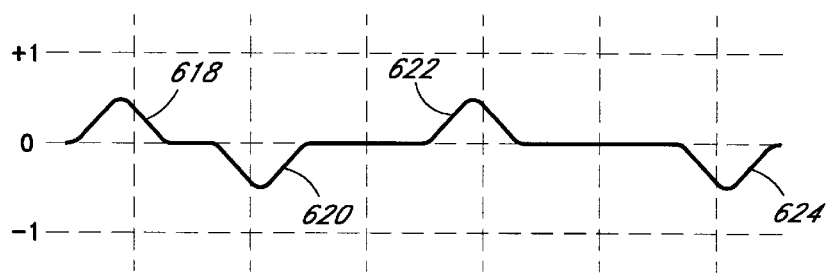
FIG. 6c is a graphical representation of the read head response attributable to the transitions encoded on a second half of the track of FIG. 5.

Accordingly, FIG. 6b illustrates the read head response waveform produced by the transitions written to the first half 502 of the track 500. In this case, the read waveform peaks 610, 612 are shifted as has been shown and described with reference to FIG. 4b. The first peak 610 leads the properly phase locked sampling position, and the second peak 612 lags the properly phase locked sampling position. Later detected read signal peaks 614, 616 continue the alternating lead/lag pattern. FIG. 6c illustrates the read head response waveform produced by the transitions written to the second half 504 of the track 500. In this case, the read waveform peaks 618, 620 are shifted as has been shown and described with reference to FIG. 4c. The first peak 618 lags the properly phase locked sampling position, and the second peak 620 leads the properly phase locked sampling position. Again, later detected read signal peaks 622, 624 continue the alternating lag/lead pattern.

Figure 6D:
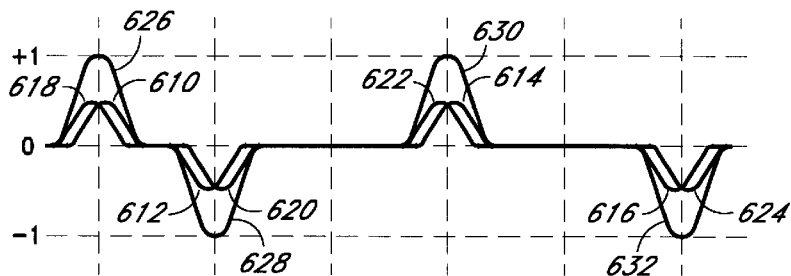
FIG. 6d is a graphical representation of the read head response resulting from a superposition of the read head responses of FIG. 6b and FIG. 6c.

Referring now to FIG. 6d, it can be seen that peak 618 and 610 will combine to produce a composite read peak 626. Similarly, peak 612 and peak 620 combine to form a composite peak 628. It may be noted that each peak 626, 628, 630, and 632 is formed from a combination of a leading peak from one half 502, 504 of the track 500, and a lagging peak from the other half 504, 502 of the track 500. Each peak 626, 628, 630, and 632 is therefore properly aligned relative to the write current reversals, and do not include timing errors by being out of phase with properly timed analog to digital waveform sampling. Timing errors produced by common DC bias across the whole track 500 or by overwriting preexisting data are largely eliminated.

Figure 7:
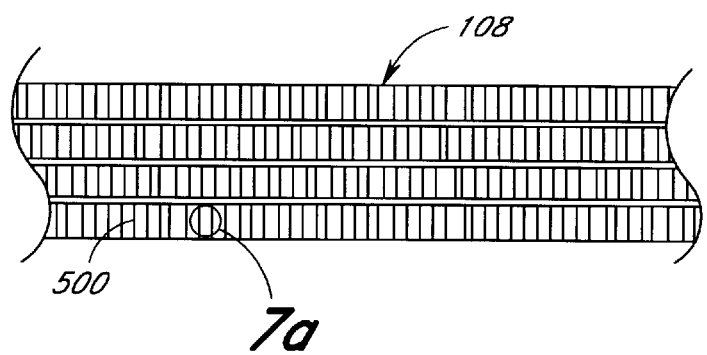
Figure 7A:
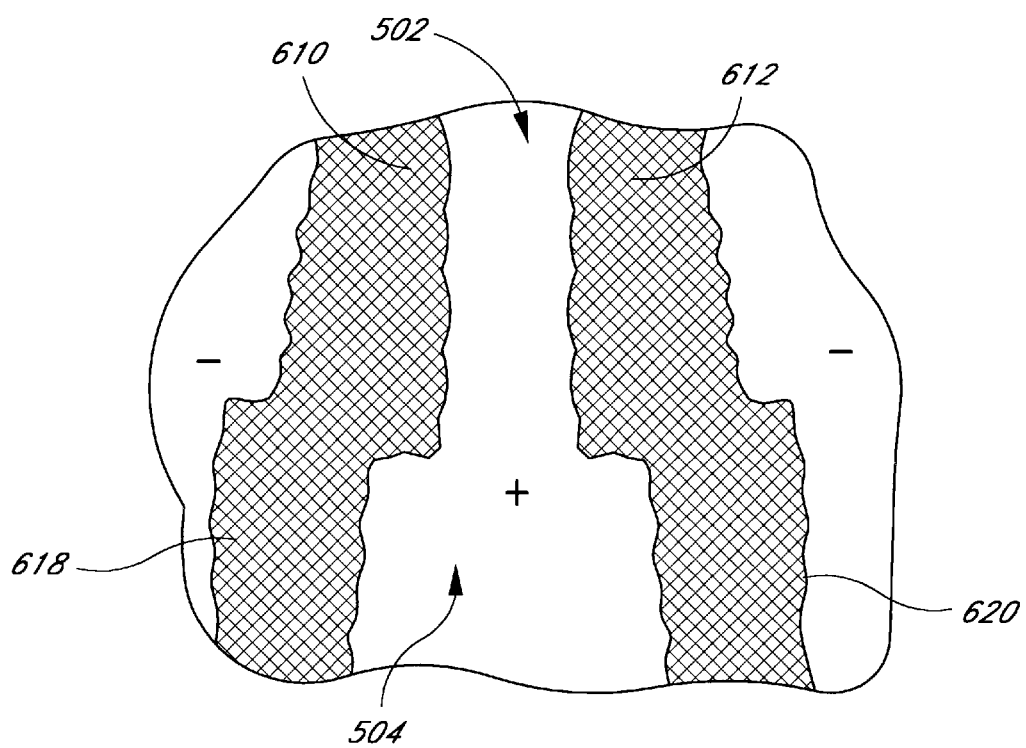

FIG. 7a illustrates a representation of the magnetization of a track 500 on a magnetic media 108 following the "11" portion of the write operation of FIG. 6a. As is also seen in FIGS. 6b and 6c, transition 618 on the second half 504 of the track 500 leads transition 610 on the first half 502 of the track 500. Also, transition 612 on the first half 502 of the track 500 leads transition 620 on the second half 504 of the track 500. It can be appreciated from examination of FIG. 7a that the rate of change of flux sensed by the read head as this portion of the track 500 passes by it will be the sum of the contributions from each track half. This sum is illustrated in FIG. 6d by the composite peaks 626, 628, 630, 632, and represents the actual waveform produced by the data stream written to the split DC biased track 500.

Figure 8A:
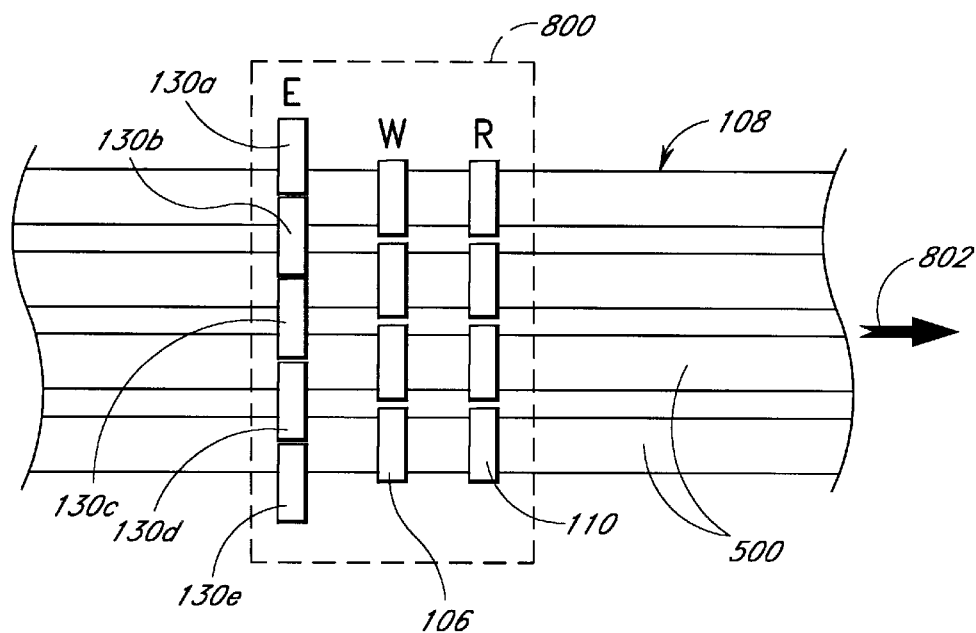
FIG. 8a is a plan view of a multi-track magnetic recording medium, illustrating a preferred unidirectional recording head configuration.
Figure 8B:
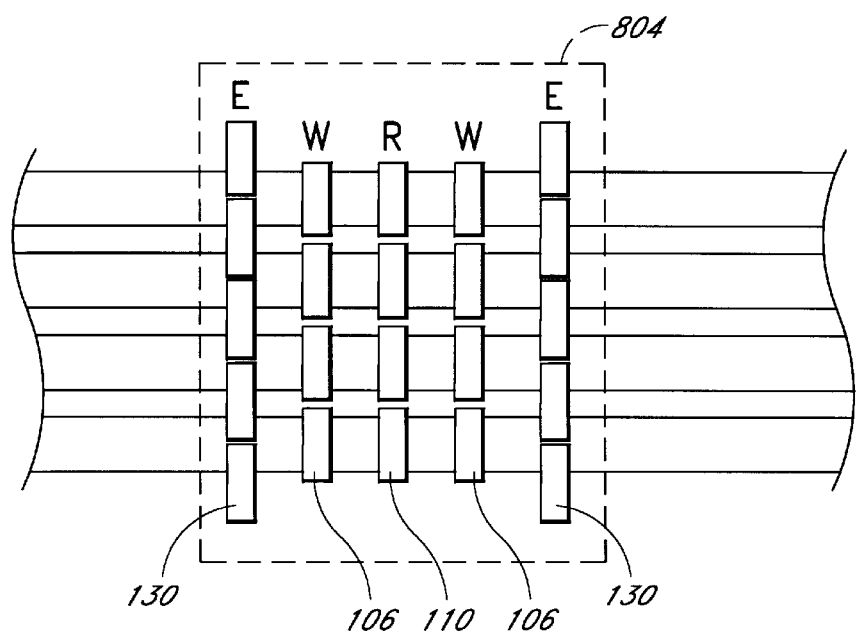
FIG. 8b is a plan view of a multi-track magnetic recording medium, illustrating a preferred bidirectional recording head configuration.

FIGS. 8a and 8b illustrate a top plan view of preferred embodiments of erase/read/write head assemblies 800, 804 for multi-track recording systems implementing the split DC bias erase discussed above. Methods of constructing suitable multi-head assemblies as described below with reference to FIGS. 8a and 8b are known to those of skill in the art and will not be described in detail herein. However, the positioning of the read, write, and erase heads in the orientation disclosed herein has not heretofore been implemented.

In particular, referring now to FIG. 8a, a plurality of write heads 106 are disposed between a plurality of erase heads 130 and read heads 110, with the erase heads being located foremost in the direction of recording medium 108 travel. As shown in FIG. 8a, a system with four tracks 500, four write heads 106, four read heads, but five erase heads 130a, 130b, 130c, 130d, and 130e is provided. In general, a total of n+1 erase heads 130 are utilized in a recording head, where n equals the number of tracks to be recorded. The erase heads 130a–130e are offset with respect to the tracks 500 and have a length such that covers adjacent half portions of adjacent tracks. Therefore, when DC bias signals of opposite polarity are alternatively applied to alternate erase head elements, the split track prepolarization pattern illustrated in FIG. 5 is produced on the two halves 502, 504.

In operation, the media 108 moves across the head 800 in the direction of arrow 802 in FIG. 8a. The tracks 500 to be written to (which may incorporate previously recorded data to be replaced with new data) therefore first pass by the erase heads 130a–130e. To produce the split track of prepolarization as illustrated in FIG. 5, adjacent erase heads are driven with bias currents of opposite polarity. For example, erase heads 130a, 130c, and 130e may be driven with a DC current of one polarity, and erase heads 130b and 130d will be driven with an equal current of the opposite polarity. Of course, the actual polarization direction of a given half of a track 500 is not significant, but in this preferred embodiment, the polarization of the first half 502 is opposite to that applied to the second half 504. After DC biasing to produce tracks in accordance with FIG. 5, the tracks 500 pass by the write heads 106 which encode an incoming data stream into transitions onto the tracks 500. If desired, the written transitions can be immediately read by the read heads 110 to provide read after write error detection. FIG. 8b illustrates a second embodiment of a head configuration 804 for a bidirectional multi-track recording system. Operation of this head 804 is identical to that described with reference to unidirectional head 800 of FIG. 8a, except one array of write and erase heads is inoperative depending on the direction of tape travel. Specifically, the write and erase head elements adjacent to the incoming recording medium will remain operative, while those adjacent to the outgoing portion of the medium will be rendered inoperative. The read head elements will remain functional in both directions of travel.

Figure 9A:
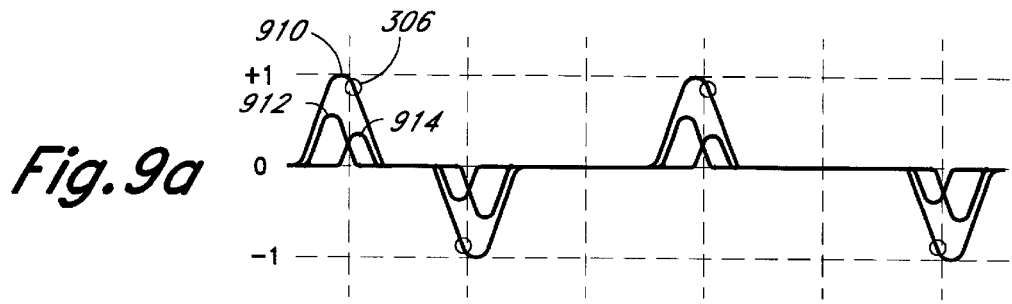
FIG. 9a is a graphical representation of the read head response attributable to the transitions encoded on the two track halves of FIG. 5 when the read head is laterally shifted toward the first track half.
Figure 9B:
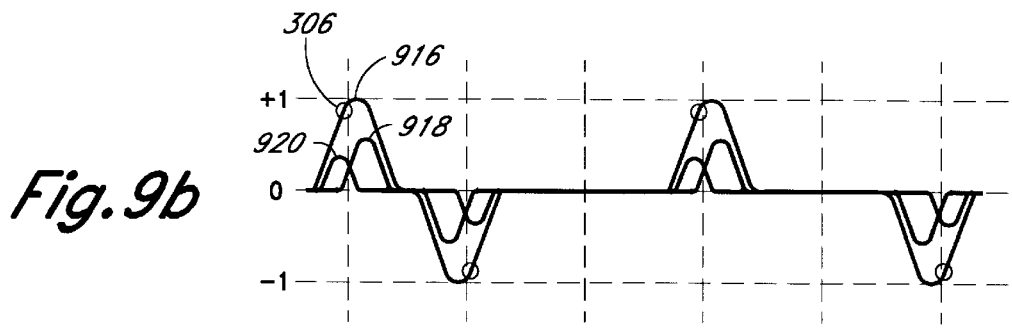
FIG. 9b is a graphical representation of the read head response attributable to the transitions encoded on the two track halves of FIG. 5 when the read head is laterally shifted toward the second track half.

It is another benefit of the split DC biased erase according to the present invention that a head position error signal can be generated from residual timing errors that will result when the read heads are off laterally track. As discussed above, conventional systems embed tracking (servo) information onto the media itself. Independent servo tracks and embedded servo segments can be avoided with the preferred split DC biased track of the present invention. Referring back to the illustration of the composite peaks of FIG. 6d, it can be appreciated that if the read head is not centered over the track, the contribution to the composite peak from one side of the track will dominate. Therefore, the timing errors removed by the split track will begin to reappear, with their magnitude being a measure of the magnitude of servo error in the read head. In essence, the composite peaks of FIG. 6d will begin to shift to appear like the peaks of FIG. 4b if the head is off track in one direction, and will begin to shift to appear like the peaks of FIG. 4c if the head is off track in the other direction. This is illustrated in more detail in FIGS. 9a and 9b. In FIG. 9a, a composite peak 910 is shifted because the signal 912 from the first half of the track dominates the signal 914 from the second half of the track. In FIG. 9b, a composite peak 916 is shifted the other way because the signal 918 from the second half of the track dominates the signal 920 from the first half of the track.

As is well known to those of skill in the art, in the absence of noise, phase errors, and gain errors, sampled data points 306 should have one of three values: zero, a maximum positive value or a maximum negative value. The maximum positive and maximum negative values are usually represented as +1 and −1, but are actually four to eight bit signed integers output by the analog to digital converter 118. For example, the output of the analog to digital converter 118 may comprise a six bit magnitude plus a sign bit, resulting in sampled values which can vary from −64 to +64. With a noise free signal and properly timed digital samples, gain may be adjusted such that sampled values 306 are either −40, 0, or +40. Noise, gain errors and timing errors result in variations from the expected +40 or −40 values for transition induced read peaks. As has been mentioned above, conventional systems may use the difference between the sampled value and the expected value, and/or a measurement of the slope of the read signal at the sampling time, to produce gain and timing metrics which control sampling times and read signal amplification such that sampled values remain close to the expected values, and read signal slope at sampling times remains near zero.

These same parameters, namely, (1) the difference between the sampled value and the expected value and (2) the slope of the read signal at the sampling time, can also be used to create a servo metric to control lateral head positioning. This is possible because as is illustrated in FIG. 3c, timing errors produced by a constant phase offset produce sampled values which are taken at alternating positively and negatively sloped regions of the read waveform. In contrast, timing errors produced by head tracking errors produce sampled values consistently taken on positively sloped regions of the read waveform for head offset in one direction (illustrated in FIG. 9b), or produce sampled values consistently taken on negatively sloped regions of the read waveform for head offset in the other direction (illustrated in FIG. 9a).

Figure 10:
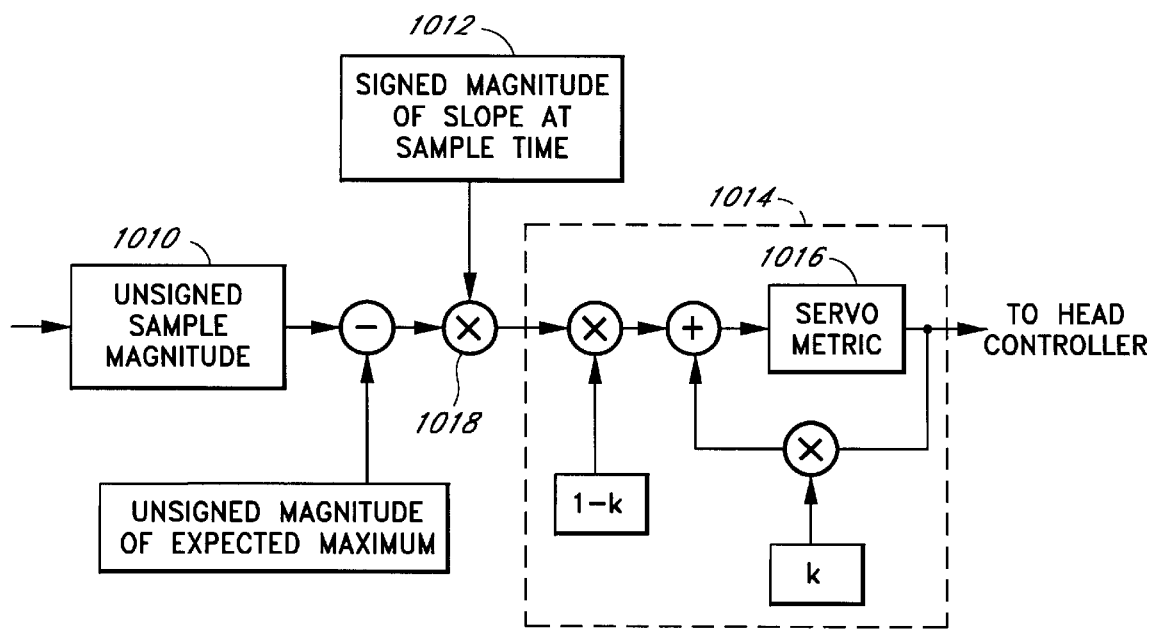
FIG. 10 is a block diagram illustrating the functional derivation of a servo metric.

A servo metric may therefore be produced as shown in FIG. 10. First, the unsigned magnitude of the sample is loaded into one register 1010, and the signed value of the slope of the read waveform at the sampling time is stored in a second register 1012. The unsigned sample value is then subtracted from the unsigned expected maximum value, for instance, 40, as described above. This value is then multiplied by the signed value of the waveform slope at the sample time, and the result is input to a digital low pass filter 1014 and into a third register 1016. The low pass filter 1014 multiplies the product output from the first multiplier 1018 of FIG. 10 by the impulse response coefficient (1−k), wherein k is preferably close to but less than 1. The result of this calculation is then added to k times the existing servo metric stored in the third register 1016 to create an updated servo metric which replaces the prior servo metric in the register 1016.

It can be appreciated that for constant sampling phase offsets as are illustrated in FIG. 3c, the slope stored in register 1012 will alternate between a positive and negative number, resulting in a contribution to the servo metric which is, on average, zero. Similarly, samples taken between peaks will make no net contribution to the servo metric because the signed slope value at the sampling time will fluctuate in a fairly narrow range around zero. Any short term effect on the servo metric due to samples taken between peaks in the read signal can also be easily removed by assigning a sample value of zero to all sample values which are below some chosen threshold such as ½ or ⅓ the expected maximum value prior to storage in the memory register 1010. It may also be desired to assign a sample value of zero to any sample value which is larger than the expected maximum value.

As discussed above, phase offsets produced by off track peak shifts will be consistently associated with sampling time slopes of the same sign, and therefore the servo metric stored in register 1014 will be proportional to the magnitude and direction of head offset. The value stored in the servo metric register can therefore be used to control a motor controller which positions the head, in that the magnitude of the servo metric following a given number of samples indicates the amount of offset, and the sign of the servo metric indicates the direction. To reduce noise and random walk type variations in the servo metric, it is preferable to utilize the described system in a recording apparatus which incorporates multiple tracks and associated multiple read heads. In this case, a servo metric for each track can be continually computed, and they can be averaged to produce an aggregate servo metric which is then utilized to control head position. Noise problems are also minimized if the servo metric is based on several hundred or several thousand sampled read waveform data points. Accordingly, the value of the constant "k" in the low pass filter of FIG. 10 is preferably in the range of 0.99 to 0.9999.

It has thus been shown that the present invention provides the benefit of mitigating the effects of data transition timing errors in digital magnetic recording systems. Further, the disclosed invention overcomes the noise limitations associated with conventional AC and DC erase systems. Collectively, these benefits allow greater data density as well as a reduced bit error rate for a given recording medium. Furthermore, the foregoing description details certain preferred embodiments of the present invention and describes the best mode contemplated. It will be appreciated, however, that no matter how detailed the foregoing appears in text, the invention can be practiced in many ways without departing from its scope. For example, a given track may be divided into multiple subportions with each subportion including first and second oppositely presaturated halves. Accordingly, the invention should be construed in accordance with the appended Claims and any equivalents thereof

What is claimed is:

1. An apparatus for recording and reading a digital signal, comprising:
    a magnetic recording medium having a track, said track having first and second recording regions that are substantially parallel to each other;
    a signal generator for generating a first signal of one polarity and a second signal of polarity opposite to that of said first signal;
    an erase head for recording said first and second signals on said first and second recording regions respectively so as to polarize said first and second recording regions in different orientations;
    a write head for recording a third signal on both of said recording regions, said third signal overwriting the different polarization orientations of said first and second recording regions created by said erase head and creating magnetic transitions on said first and second recording regions; and
    a read head for reading said magnetic transitions from both said first and second recording regions and producing a fourth signal which comprises a contribution from the magnetic transition on said first recording region and a contribution from the magnetic transition on said second recording region.

2. The apparatus of claim 1, wherein said erase, write and read heads are contained in one assembly.

3. The apparatus of claim 1, wherein said third signal is digital data in the NRZ-M coding format.

4. The apparatus of claim 1, wherein said apparatus contains a plurality of said erase, read and write heads.

5. The apparatus of claim 4, wherein said erase heads are offset from said read and write heads such that at least one erase head is disposed above portions of two adjacent tracks.

6. The apparatus of claim 1, wherein said recording medium is a magnetic tape.

7. The apparatus of claim 1, wherein said recording medium is a magnetic disk.

8. The apparatus of claim 1, wherein said tracks and recording regions are longitudinally disposed along the length of said medium.

9. The apparatus of claim 1, wherein said signal generator simultaneously generates said first and second signals.

10. The apparatus of claim 1, wherein said polarity of said first and second signals is constant.

11. An apparatus for recording a digital signal, comprising:
    a magnetic recording medium having substantially parallel first and second recording regions;
    a signal source which provides a first signal of a first polarity and a second signal of a second polarity;
    a first head for recording said first and second signals on said first and second recording regions, respectively so as to polarize said first and second recording regions in different orientations;
    a second head for recording a third signal overwriting the different polarization orientations of said first and second recording regions created by said erase head and creating magnetic transitions on said first and second recording regions; and
    a third head for reading said magnetic transitions from both said first and second recording regions and producing a fourth signal which comprises a contribution from the magnetic transition on said first recording region and a contribution from the magnetic transition on said second recording region.

12. The apparatus of claim 11, wherein said first head is an erase head.

13. The apparatus of claim 11, wherein said second head is a write head.

14. The apparatus of claim 11, wherein said first and second recording regions are separated by a region which is not polarized.

15. The apparatus of claim 11, wherein said first and second recording regions lie in a track.

16. The apparatus of claim 11, wherein said recording medium has a plurality of tracks.

17. The apparatus of claim 16, wherein said first head is offset from said second and third heads such that said first head is disposed above two adjacent tracks.

18. The apparatus of claim 11, wherein said signal source is a signal generator.

19. The apparatus of claim 11, wherein said first and second polarities are opposite one another.

20. The apparatus of claim 11, wherein said first and second signals are recorded simultaneously.

21. The apparatus of claim 11, wherein said first and second recording regions each constitute approximately half of the total recording area of the track.

22. The apparatus of claim 11, wherein said apparatus contains a plurality of said first, second and third heads.

23. The apparatus of claim 11, wherein said third signal is digital data in the NRZ-M coding format.

24. The apparatus of claim 11, wherein said third signal is digital data in the NRZI coding format.

25. The apparatus of claim 11, wherein said recording medium is a magnetic tape.

26. The apparatus of claim 11, wherein said recording medium is a magnetic disk drive.

27. The apparatus of claim 11, wherein said tracks and recording regions are longitudinally disposed along the length of said medium.

28. The apparatus of claim 11, wherein said polarity of said first and second signals is constant.

29. A method for recording digital data on a track of a magnetic recording medium, comprising:

defining first and second recording regions in said track;

substantially polarizing said first recording region with a first signal having a first polarity;

substantially polarizing said second recording region with a second signal having a second polarity opposite to said first polarity;

overwriting the polarization produced by said first and second signals by substantially polarizing both first and second recording regions with a third signal having transitions of polarity.

30. The method of claim 29, wherein said third signal comprises digital data in the NRZ-M coding format.

31. The method of claim 29, wherein said third signal is digital data in the NRZI coding format.

32. The method of claim 29, wherein said recording medium is divided into tracks.

33. The method of claim 29, wherein said recording medium is a magnetic tape.

34. The method of claim 29, wherein said recording medium is a magnetic disk.

35. The method of claim 29, wherein said recording regions are longitudinally disposed along the length of said track.

36. A magnetic recording medium having at least one track for recording signals thereon, said track having a length and a width, wherein said length is much greater than said width, and wherein said track comprises a magnetic medium configured for storing data as a series of magnetic transitions, said magnetic medium being located at the surface of said track so as to be available for polarization by a write head passing over said track during a data writing operation performed to store data on said magnetic recording medium, said magnetic medium being prepared for said data writing operation by configuring a first portion of said magnetic medium extending only partially across said width to be substantially polarized in a first orientation and by configuring a second portion of said magnetic medium extending only partially across said width to be substantially polarized in a second orientation.

37. The medium of claim 36 wherein said first orientation is substantially opposite said second orientation.

* * * * *